3,412,141
PRODUCTION OF TERTIARY-ALKYL ACRYLATES
AND METHACRYLATES
Hugo Kroeper, Heidelberg, Hans-Martin Weitz, Frankenthal (Pfalz), Rolf Platz, Mannheim, and Karl Schloemer, Ludwigshafen (Rhine), Germany, assignors to Badische Anilin- & Soda-Fabrik Aktiengesellschaft, Ludwigshafen am Rhine, Germany
No Drawing. Filed Aug. 9, 1965, Ser. No. 478,446
Claims priority, application Germany, Aug. 12, 1964, B 78,065
4 Claims. (Cl. 260—486)

ABSTRACT OF THE DISCLOSURE

Production of t-alkyl acrylates and methacrylates from acrylic acid or methacrylic acid and tertiary olefins in the presence of an active bleaching earth at a temperature of from 0 to 40° C.

---

This invention relates to a process for the production of tertiary-alkyl acrylates and methacrylates from acrylic acid or methacrylic acid and tertiary olefins.

It is already known that tertiary-alkyl esters of $\alpha,\beta$-olefinically unsaturated acids can be prepared by reaction of appropriate unsaturated carboxylic acids with tertiary olefins in the presence of acid catalysts. Conventional catalysts are sulphuric acid, boron trifluoride and aromatic sulphonic acids. However, when working up the esterification mixture in the presence of said catalysts, partial cleavage of the tertiary-alkyl carboxylate back into carboxylic acid and tertiary olefin takes place. For this reason it has been recommended to wash out the catalyst previously from the reaction mixture with water. This involves considerable loss of catalyst and carboxylic acid so that only moderate yields (with reference to the carboxylic acid used) are obtained.

It is also already known that orthophosphoric acid supported on diatomaceous earth will catalyze the reaction of tertiary olefins with carboxylic acids. Although this catalyst may be easily separated from the reaction mixture, it has the disadvantage that a considerable proportion of the tertiary olefin polymerizes.

It is an object of the present invention to provide a process for the production of tertiary-alkyl acrylates or methacrylates from acrylic acid or methacrylic acid and a tertiary olefin, in which the ester prepared may be separated simply from the reaction mixture without being split again into the starting materials. It is another object of the invention to provide a catalytic process for the production of tertiary-alkyl acrylates or methacrylates in which the catalyst used may be readily separated from the reaction mixture. Another object of this invention is to provide a catalytic process for the production of tertiary-alkyl acrylates or methacrylates in which the catalyst, after it has been separated from the reaction mixture, may be reused without further chemical or physical treatment. A further object of the invention is to provide a catalyst for the production of tertiary-alkyl acrylates or methacrylates from a tertiary olefin and acrylic acid or methacrylic acid, said catalyst being such that practically no polymerization or oligomerization of the reacting tertiary olefin takes place in the presence thereof.

These and other objects are achieved in the production of tertiary-alkyl acrylates or methacrylates having the general Formula I:

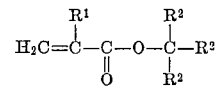

by reacting acrylic acid or methacrylic acid with a tertiary olefin having the general formula II:

in the presence of an esterification catalyst at atmospheric or superatmospheric pressure by using an active bleaching earth which contains from 0.005 to 0.1 mval./g. of free titratable acid as the esterification catalyst and using temperatures of from 0° to 40° C. The radical $R^1$ in Formula I denotes hydrogen or methyl. The radicals $R^2$ in Formulae I and II denote alkyl groups having one to four carbon atoms. The radical $R^3$ denotes alkylidene having one to four carbon atoms. It is preferred to use bleaching earths which contain from 0.01 to 0.04 mval./g. of free titratable acid. The preferred temperature range for carrying out the process is from 15° to 30° C. The term "mval./g." stands for the amount of acid (in mval.) per gram of catalyst.

$$\text{An mval.} = \frac{1}{1000} \text{ val.} = \frac{1}{1000} \frac{\text{gram atom (mole)}}{\text{valence}}$$

An active bleaching earth is defined as an aluminum hydrosilicate, such as is used for example in refining oils and fats. As a rule the bleaching earths used as catalyst have 50 to 75% by weight of $SiO_2$, 10 to 30% by weight of $Al_2O_3$, 2 to 8% by weight of $Fe_2O_3$ 1 to 9% by weight of MgO and small amounts (e.g., 0.1 to 2% by weight) of the oxides of the other alkaline earth metals. The bleaching earths may, however, also contain for example 2 to 8% by weight of boric acid. It is advantageous to increase the activity of the bleaching earth prior to its use. This may be carried out by conventional methods, for example by treating it with strong mineral acids, such as sulphuric acid, hydrofluoric acid or hydrochloric acid, and washing it with water. As a rule the catalyst is used in an amount of 5 to 10% by weight with reference to the acrylic acid or methacrylic acid to be esterified. Larger amounts may be used however, for example 10 to 50% by weight, or smaller amounts, for example 0.5 to 5% by weight.

When the catalyst has been used in powder form, it may be separated from the reaction mixture by filtration. The active bleaching earth may be used in the form of press mouldings, particularly when working continuously. The reaction mixture flowing from the reactor when carrying out the process continuously contains not only the desired tertiary-alkyl carboxylate, but also amounts of unreacted carboxylic acids which vary according to the reaction conditions and which may readily be separated, for example by distillation.

The acrylic acid or methacrylic acid may contain small amounts, for example 0.05 to 5% by weight, preferably 0.1 to 2% by weight, of water. This water content does not substantially affect the ester formation but lessens the formation of polymers so that in many cases it is advantageous to use acids which contain a small amount of water.

The preferred tertiary olefins having the general Formula II have four to eight carbon atoms. Examples of such tertiary olefins are isobutylene, 2-methylbutene-(1), 2-methylbutene-(2), 2-methylpentene-(2), 2-methylpentene-(1), 3-methylpentene-(2) and 4-methylpentene-(3). The tertiary olefins may be used in pure form or mixed with other primary or secondary olefins or saturated hydrocarbons having the same number of carbon atoms. Thus for example pure isobutylene or a mixture of $C_4$-hydrocarbons such as is obtained by various cracking methods may be used for example for the production of tertiary-butyl acrylate. In general the content of tertiary olefin in the mixture should not be less than 40% by volume.

The tertiary olefin and the acrylic or methacrylic acid are preferably used in the molar ratio 2:1 to 1:2. A larger excess, for example a five times molar excess, of one or other reactant may however be used. The reactants may be supplied separately or mixed in the liquid phase to the reactor filled with catalyst. In a preferred embodiment of the process, the tertiary olefin is passed in gas phase into a suspension of bleaching earth in the carboxylic acid. When carrying out the process continuously with a stationary catalyst, the gaseous tertiary olefin may be reacted countercurrent to the carboxylic acid. To achieve a high conversion it is advantageous to recycle the reaction mixture repeatedly over the catalyst. Recycling the gaseous tertiary olefin also results in an increase in the conversion.

The reaction is carried out at temperatures of from 0° to 40° C. At temperatures above 40° C., oligomers and polymers of the tertiary olefin are formed to an increasing extent and this results in a loss of yield. When preparing tertiary butyl acrylate from isobutylene and acrylic acid, it is preferred to use a temperature of from 10° to 40° C. At higher temperatures acrylic acid readily reacts to form diacrylic acid and higher polymers. The process may be carried out at elevated pressure, e.g., at a pressure up to 25 atmospheres, but it is preferred to use atmospheric pressure or a slightly elevated pressure up to 5 atmospheres. The use of superatmospheric pressure is necessary if a normally gaseous teritary olefin is to be reacted in liquid phase with the carboxylic acid.

The carboxylic esters which can be prepared by the process are valuable monomers for the production for example of copolymers with vinyl propionate. The copolymers are eminently suitable for the production of coating materials which are very resistant to water.

The invention is further illustrated by the following Examples. The parts specified in the examples are parts by weight, unless otherwise stated. Parts by weight bear the same relation to parts by volume as the gram to the liter.

EXAMPLE 1

20 parts of finely powdered active bleaching earth (known under the name Tonsil) is suspended in 400 parts of acrylic acid in a stirred vessel. The bleaching earth has the following composition: 72% of $SiO_2$, 13% of $Al_2O_3$, 5% of $Fe_2O_3$, 1.5% of MgO, and 0.8% of CaO; it has a loss on ignition of 7.2%. The free titratable acid amounts to 0.013 mval./g. While the temperature is kept at 25° C., 250 parts per hour of a $C_4$-hydrocarbon mixture containing 56.3% by weight of isobutylene is passed into the suspension as a gas. The portion of the gas which is not absorbed is collected in a cooled trap and amounts to 40 parts containing 49% by weight of isobutylene. Of the 210 parts of gas mixture which is absorbed in the acrylic acid, 144 parts, containing 38.5% by weight of isobutylene, is recovered by degassing under subatmospheric pressure. The catalyst is filtered off and the tertiary-butyl acrylate formed is distilled off from the reaction mixture. 152 parts of the ester is obtained and also 0.5 part of diisobutylene. With reference to isobutylene used, this is equivalent to a conversion of 46.5% into tertiary-butyl acrylate and 0.35% into diisobutylene.

EXAMPLE 2

250 parts of a $C_4$-hydrocarbon mixture containing 56.3% by weight of isobutylene is passed into a suspension of 20 parts of the bleaching earth described in Example 1 in 400 parts of acrylic acid under the conditions specified in Example 1. The bleaching earth has been previously activated with hydrochloric acid. It has 0.035 mval./g. of free titratable acid. 18 parts of the gas supplied (containing 23% by weight of isobutylene) is not absorbed and 119 parts (containing 20% by weight of isobutylene) is recovered by degassing under subatmospheric pressure. When the reaction mixture is distilled under subatmospheric pressure in the presence of 2 parts of hydroquinone as stabilizer, 257 parts of tertiary-butyl acrylate is obtained. The conversion is 78.5% with reference to isobutylene used. 0.9 part of diisobutylene is also obtained.

EXAMPLE 3

30 parts of bleaching earth (montmorillonite) which has been activated with sulphuric acid and which contains 0.03 mval./g. of free titratable acid is suspended in 250 parts of acrylic acid and 2 moles of acrylic acid per hour is supplied thereto continuously at 28° C. in a stirred vessel. 2 moles per hour of isobutylene is passed into the mixture. Unabsorbed gas is collected in a cooled trap. The reaction product and unreacted acrylic acid are continuously withdrawn through a fritted glass disk. 92 parts per hour of tertiary-butyl acrylate is isolated from the reaction mixture by distillation. With an acid residence time of ninety minutes, the conversion is 36%. 1% of the isobutylene used is converted into diisobutylene.

EXAMPLE 4

2 moles of acrylic acid per hour is reacted with 1 mole of isobutylene per hour under the conditions specified in Example 3. 78 parts of tertiary-butyl acrylate per hour is recovered from the reaction mixture by distillation. This is equivalent to a conversion of isobutylene of 61%.

EXAMPLE 5

2 moles of an acrylic acid containing 0.2% by weight of water is reacted countercurrent per hour with 1 mole of isobutylene per hour at 20° C. in a reactor filled with 1 part by volume of 4 x 10 mm. pellets of Tonsil having the properties specified in Example 1. 0.45 mole of tertiary-butyl acrylate is isolated per hour from the reaction mixture. 0.003 mole of diisobutylene is also isolated. This is equivalent to an isobutylene conversion of 45%.

EXAMPLE 6

2 moles of an acrylic acid containing 0.2% of water is reacted as described in Example 5 with 1 mole of isobutylene per hour at 20° C., but deviating from Example 5 the mxiture of acid and ester is pumped at a rate of 4 parts by volume per hour over the catalyst at the same time. Conversion to tertiary-butyl acrylate is 60% with reference to isobutylene passed through. 0.6 mole per hour of tertiary-butyl acrylate is obtained from the reaction mixture withdrawn.

We claim:
1. A process for the production of tertiary-alkyl esters having the formula:

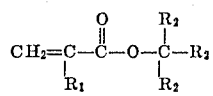

in which $R_1$ denotes a member selected from the group consisting of hydrogen and methyl and $R_2$ denotes alkyl with 1 to 4 carbon atoms, by reacting a carboxylic acid having the formula:

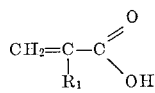

in which $R_1$ has the meaning given above with a tertiary olefin having the formula:

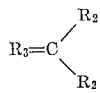

in which $R_2$ has the above meaning and $R_3$ denotes alkylidene with 1 to 4 carbon atoms, in the presence of an esterification catalyst, wherein the esterification catalyst used is an aluminum hydrosilicate active bleaching earth which contains from 0.005 to 0.1 mval./g. of free titratable acid and the process is carried out at a temperature of from 0° to 40° C.

2. A process as claimed in claim 1, wherein the active bleaching earth contains from 0.01 to 0.04 mval./g. of free titratable acid.

3. A process as claimed in claim 1 carried out at from 15 to 30° C.

4. A process for the production of tertiary-alkyl esters having the formula:

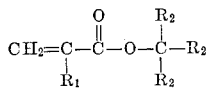

in which $R_1$ denotes a member selected from the group consisting of hydrogen and methyl and $R_2$ denotes alkyl with 1 to 4 carbon atoms, by reacting a carboxylic acid having the formula:

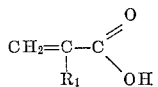

in which $R_1$ has the meaning given above with a tertiary olefin having the formula:

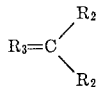

in which $R_2$ has the above meaning and $R_3$ denotes alkylidene with 1 to 4 carbon atoms, in the presence of an esterification catalyst, wherein the esterification catalyst used is an aluminum hydrosilicate active bleaching earth which contains from 0.01 to 0.04 mval./g. of free titratable acid and the process is carried out at a temperautre of from 15° to 30° C.

References Cited

UNITED STATES PATENTS

| 2,525,145 | 10/1950 | Mavity | 260—497 |
| 3,085,108 | 4/1963 | Stepanek | 260—497 |
| 3,088,969 | 5/1963 | Callahan et al. | 260—486 |
| 3,096,365 | 7/1963 | Heisler et al. | 260—497 |
| 3,167,578 | 1/1965 | Fernholz et al. | 260—486 XR |

FOREIGN PATENTS 905,854   9/1962   Great Britain.

LORRAINE A. WEINBERGER, *Primary Examiner.*

A. P. HALLUIN, *Assistant Examiner.*